United States Patent [19]
Wilson

[11] Patent Number: 5,185,796
[45] Date of Patent: Feb. 9, 1993

[54] ENCRYPTION SYNCHRONIZATION COMBINED WITH ENCRYPTION KEY IDENTIFICATION

[75] Inventor: Alan L. Wilson, Hoffman Estates, Ill.

[73] Assignee: Motorola, Inc., Schaumburg, Ill.

[21] Appl. No.: 707,487

[22] Filed: May 30, 1991

[51] Int. Cl.⁵ ............................................. H04L 9/00
[52] U.S. Cl. ........................................ 380/21; 380/48
[58] Field of Search ............................ 380/21, 48, 49

[56] References Cited

U.S. PATENT DOCUMENTS

| Re. 33,189 | 3/1990 | Lee et al. | 380/21 |
| 4,408,093 | 10/1983 | Place | 380/49 |
| 4,484,025 | 11/1984 | Ostermann et al. | 380/21 |
| 4,607,137 | 8/1986 | Jansen et al. | 380/49 |
| 4,713,840 | 3/1988 | Mniszewski et al. | 380/21 |
| 4,757,536 | 7/1988 | Szczutkowski et al. | 380/48 |
| 4,905,234 | 2/1990 | Childress et al. | 370/94.1 |
| 4,995,080 | 2/1991 | Bestler et al. | 380/21 |
| 5,093,860 | 3/1992 | Steinbrenner et al. | 380/21 |

*Primary Examiner*—Salvatore Cangialosi
*Attorney, Agent, or Firm*—Steven G. Parmelee; Susan L. Lukasik

[57] ABSTRACT

In an encrypted radio system, transmsitters and receivers can each be provided with a plurality of encryption algorithms (407 and 425) and/or encryption key variables (408 and 426). A unique logical ID (409 and 427) corresponds to each of the above. During transmission of an encrypted message, both encryption synchronization information (319) and information concerning the logical ID (318) is repetitively interleaved with the encrypted message itself. So configured, a receiver that temporarily loses viable reception can again obtain encryption synchronization and algorithm/key information, and therefore rapidly recover from the reception disturbance.

18 Claims, 2 Drawing Sheets

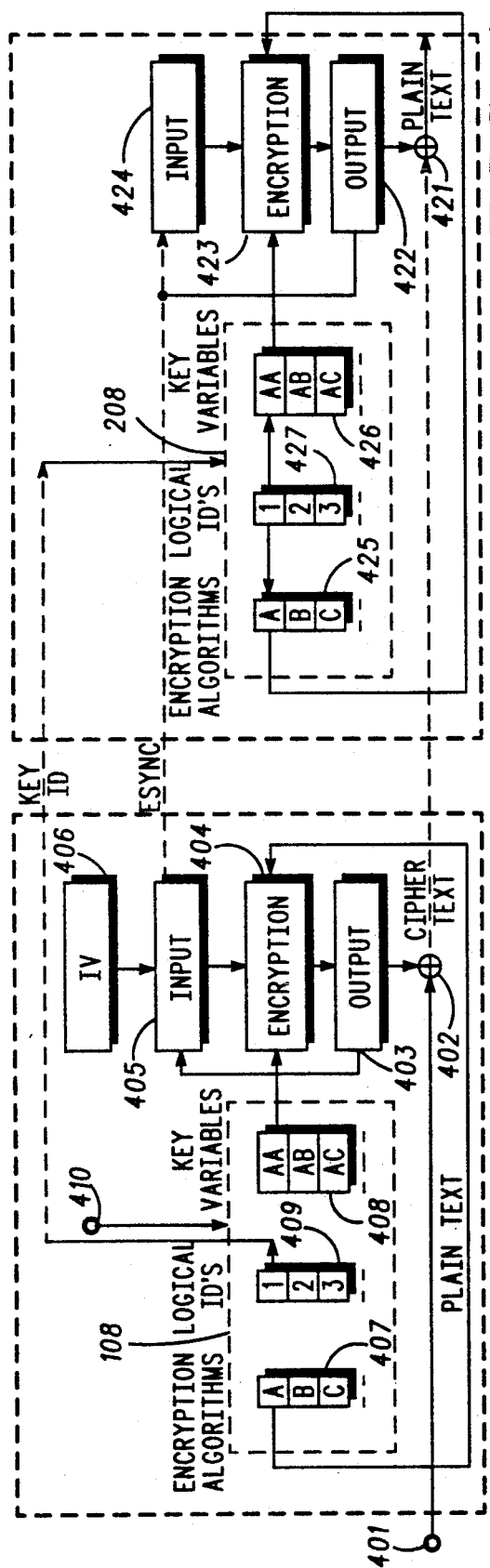
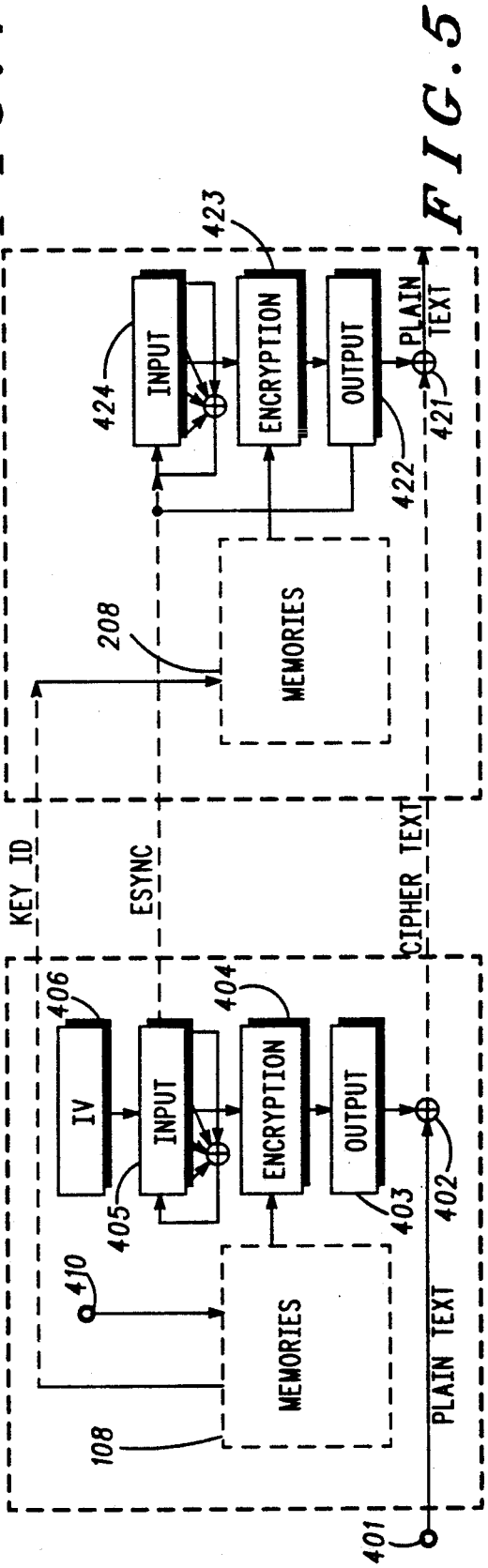

ENCRYPTION SYNCHRONIZATION COMBINED WITH ENCRYPTION KEY IDENTIFICATION

FIELD OF THE INVENTION

This invention relates generally to radio communication systems, including but not limited to transmission and reception of encrypted messages.

BACKGROUND OF THE INVENTION

Radio communication systems, including two-way communication systems are well known in the art. In many such systems, the communication channel (wherein the "channel" may be a dedicated frequency, a frequency or frequency pair allocated pursuant to a frequency division multiplexing scheme, one or more assigned time slots in a time division multiplexed system, a code division multiplexed channel, or other radio frequency communication path) supports transmission and reception of an encrypted signal.

In a typical encrypted system, an original message, such as a voice message, is appropriately processed into an information stream comprising a series of bits. These bits are then further processed pursuant to an encryption scheme to yield an encrypted message.

Typically, any system supporting transmission of digitized information provides for some mechanism to ensure at least an acceptable degree of synchronicity between the reception process and the transmission process, to assure correct decoding of the data. In addition, in an encryption system, an encryption synchronization signal is also additionally provided, which encryption synchronization signal is specifically utilized to assure appropriate decoding of the encrypted message.

In a radio communication system, and particularly a radio system supporting communications in a land mobile environment, communication links are occasionally interrupted for brief intervals due to various interfering phenomena, such as multipath distortion and fading. Upon losing reception of a transmitted encrypted message due to such occasional brief interruptions, a receiver may well lose its previously established encryption synchronization. Consequently, upon subsequently recovering the signal, proper reception and decoding may be unsatisfactory.

One prior art solution to the above suggests interleaving encryption synchronization information from time to time with the encrypted message information, such that the encryption synchronization information is repetitively broadcast. Therefore, if a receiver should momentarily lose reception, synchronization can usually be readily reestablished following the next one (or more) transmission of encryption synchronization information.

The above prior art solution potentially resolves at least some of the problems noted above, but only serves to support continued communications in a relatively simple encryption system. In a communication system that supports use of multiple encryption algorithms and/or encryption keys, reestablishing encryption synchronization alone will often be inadequate to ensure rapid reestablishment of reception and message processing.

Accordingly, a need exists for a radio platform and methodology that will facilitate robust transmission and reception of encrypted messages in an encryption system supporting use of one or more encryption algorithms and/or encryption keys.

BRIEF DESCRIPTION OF THE DRAWINGS

FIG. 4 comprises a block diagram depiction of encryption and decryption processing in accordance with the invention; and FIG. 5 comprises a block diagram depiction of an alternative embodiment of encryption and decryption processing in accordance with the invention.

DESCRIPTION OF A PREFERRED EMBODIMENT

Figure 1:
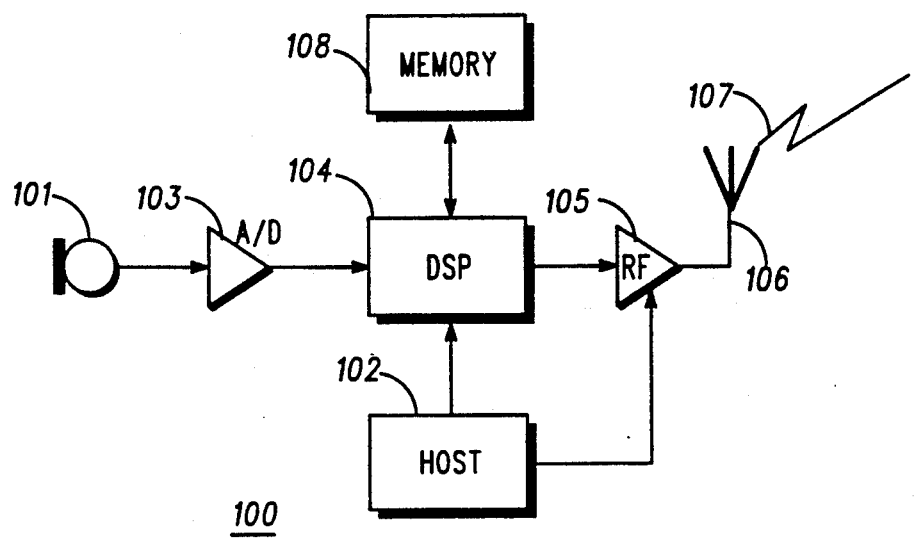
FIG. 1 comprises a block diagram depiction of a radio transmitter in accordance with the invention.

A transmitter constructed in accordance with the invention appears in FIG. 1 as generally represented by the reference numeral 100. This radio transmitter (100) includes generally a microphone (101) for receiving an audible voice message to be transmitted. The transduced output of the microphone (101) comprises an analog signal representing the voice input, and passes through an appropriate analog to digital converter (103), which digitizes this information and provides the digital representation to a digital signal processor (DSP) (104) (such as a DSP56000 as manufactured and sold by Motorola, Inc.). The DSP (104) is programmed as desired to effectuate a particular voice encoding methodology, such as CELP or VSELP. In this particular embodiment, it will be presumed that the encoding methodology of choice is VSELP. (For further information regarding VSELP encoding, the interested reader is referred to U.S. Pat. No. 4,817,157 entitled "Digital Speech Coder Having Improved Vector Excitation Source", the latter being incorporated herein by this reference.) The DSP then encrypts the digitized result of the voice encoding methodology, as described below in more detail. This encryption makes use of encryption algorithms and keys that are stored in a memory (108).

The DSP (104) produces at its output a plurality of discrete packets, wherein each packet represents encrypted information representing a portion of the original speech information. These packets are provided to an appropriate radio frequency (RF) unit (105), which uses the packet information to modulate an appropriate carrier signal, which carrier signal (107) is then radiated from an appropriate radiating element (106), all as well understood in the art.

Both the DSP (104) and the RF unit (105) are controlled, at least in part, by a host computer (102) (such as a HC11 as manufactured and sold by Motorola, Inc.). This control includes encryption algorithm and key selection, again as explained below in more detail.

Figure 2:
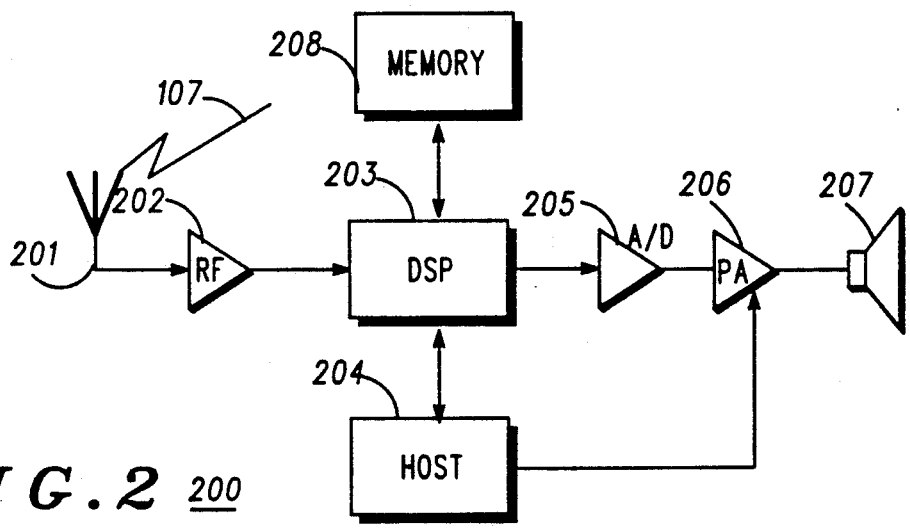
FIG. 2 comprises a block diagram depiction of a radio receiver in accordance with the invention.

Referring now to FIG. 2, a compatible receiver (200) includes an antenna (201) for receiving the carrier signal (107), and an associated RF unit (202) for receiving this signal and demodulating it to retrieve the discrete packets as sourced by the transmitter (100). These recovered packets are provided to a DSP (203) that has been appropriately ¨ogrammed to reconstruct the original voice information based upon the voice packet information. As will be described in more detail, these packets have interleaved therewith encryption information pertinent to initiating and maintaining decryption of the received message. This information includes algorithm and key information to allow retrieval of the correct algorithm and key from a corresponding memory (208).

The output of the DSP (203) comprises a digitized representation of the original voice message. This output passes through an appropriate digital to analog converter (205) and then to a power amplifier (206). The latter amplifies the reconstructed analog voice information, and a speaker (207) then renders this information audible.

Referring now to FIG. 3, the signalling strategy for this system will be described.

At the beginning of each message, a data preamble preceeds transmission of a plurality of session data units (described further below). In this embodiment, and referring to FIG. 3A, the preamble (300) begins with a 5 millisecond sine wave bit synch (301), followed by a 48 bit frame synchronization pattern (302) and a 64 bit network identifier (303). The next 96 bits (304) are used for encryption synchronization (80 bits) and key ID information (16 bits) (as noted further below, the initial encryption synchronization information contained in the preamble will typically be an initialization vector as provided by the encryption platform used therewith). The preamble (300) also includes 12 bits (305) to represent talk group ID information, and an additional 468 bits (306) to support other signalling appropriate to a particular application.

Figure 3B:
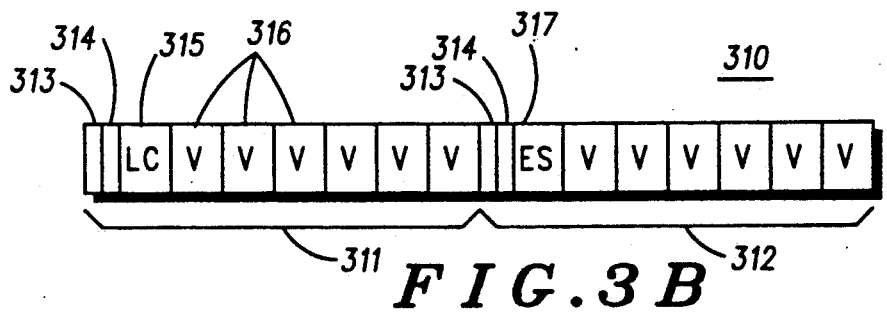
FIGS. 3a, 3b, and 3c comprise depictions of a data framing strategy in accordance with the invention.
Figure 3A:
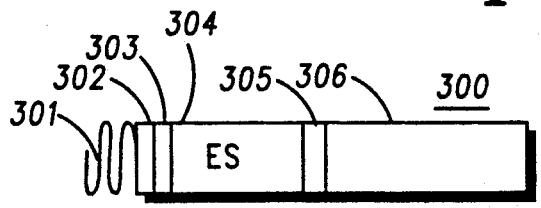

Subsequent to the preamble, this system repetitively presents a session data unit (310) (with only one such unit being depicted in FIG. 3B for purposes of clarity). Each session data unit (310) includes two frames (311 and 312). Each frame (311 and 312) includes a first packet (313) that, in this embodiment, comprises 48 bits of synchronizing pattern information. Following this, each frame (311 and 312) includes a second packet (314) that constitutes a 64 bit network signalling word (which actually contains 16 bits of information). In the first frame (311), the next packet (315) comprises a 240 bit link control word (containing 60 bits of information), whereas the second frame (312) includes a third packet (317) representing 288 bits of encryption information for use in encrypted signalling. (If desired, presentation address data can be included with both the link control word and the encryption information.) Lastly, each frame (311 and 312) includes six voice packets (316), where each voice packet comprises a 208 bit packet of information representing 144 bits of VSELP information.

In this particular embodiment, the above totals to 3,360 bits for each session data unit, representing 360 milliseconds from a temporal standpoint.

Pursuant to this protocol, each voice packet (316) corresponds to a single discrete packet as provided by the encoding DSP (104). The contents of the signalling information are sourced and controlled by the host computer (102) associated therewith.

Figure 3C:
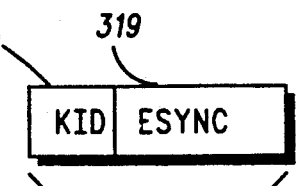

The encryption information packet (317) in this embodiment includes both a key ID field (318) and an encryption synchronization field (319) (see FIG. 3C). In this particular embodiment, 16 bits are utilized for the key ID (318) and 64 bits are used for the encryption synchronization information itself (319). As will be explained in more detail below, the key ID (318) can serve to identify either or both a particular encryption algorithm and a particular encryption key. As well understood in the art, the encryption synchronization information (319) includes initialization vector data, the latter also being referred to in more detail below.

The session data unit format repeats continuously during transmission of a message. Consequently, at least once every 360 milleseconds, both encryption synchronization information and key ID information is transmitted during the second frame (312) of the session data unit (310). Therefore, even if a receiving radio should momentarily lose reception, the receiver can both reestablish encryption synchronization and reconfigure an appropriate decryption platform (using the appropriate algorithm and key). These same benefits also accrue to a receiver that joins the communication in progress late. In either case, lengthy gaps in reception as might otherwise occur using prior art methods are substantially avoided.

Referring now to FIG. 4, additional information will be provided regarding the encryption platform in general, and the key ID information in particular.

On the transmission side, a source (401) provides nonencrypted digitized information (such as user data or digitized voice) known in the art as plain text. The transmitter combines (402) this plain text with encryption bits provided by an encryption output (403) to produce encrypted information, typically known as cipher text. In this particular embodiment, a DES (digital encryption standard) encryption platform has been utilized. Such platforms operate in an output feedback mode, wherein encryption proceeds as a function of a 56 bit key and a 64 bit input argument, with a net result being a 64 bit output value.

As well understood in the art, an input value for the encryption process is initially derived from a specially stored vector called the initialization vector (IV) (406). During subsequent processing, the input (405) is derived from the output value via a feedback path from the output (403) (hence the name, output feedback mode).

The encryption process itself (404) utilizes both an encryption algorithm and an encryption key to process the input (405) and yield the output (403), the latter then being available for combination with the plain text information. In this particular embodiment, a memory (108) (or plurality of memories, as may be appropriate to a particular application) store both the encryption algorithms (407) and key variables (408). In this embodiment, a plurality of each are available. Also stored in the memory (108) are a plurality of logical IDs (409). In this embodiment, each logical ID (1, 2, 3 . . . ) corresponds to a particular one of the encryption algorithms (A, B, C, . . . ) and key variables (AA, AB, AC, . . . ). For example, logical ID 2 corresponds to encryption algorithm B and key variable AB, whereas logical ID 1 corresponds to encryption algorithm A and key variable AA.

As generally represented in FIG. 4, the cipher text, encryption synchronization information from the input (405), and key ID information is provided by the transmitter to the receiver. The cipher text is provided in the voice slots (316) that are available in the session data units (310). The encryption synchronization information and key ID information is transmitted in the packet (317) made available for such information in the session data unit (310) as well.

At the outset, the encryption synchronization information will L the initialization vector (406) as transmitted in the preamble. Thereafter, the encryption synchronization information will change, to reflect the changing input (405). The key ID information, on the other hand, will remain constant to reflect the encryption algorithm and/or key variable then in use. For example, if encryption algorithm C and key variable AC is then in use to encrypt the plain text, then logical ID 3 will be sent during each retransmission. (If, of course, the algorithm and key are changed during transmission, then the key ID will be altered to reflect the new logical ID.)

As is typical in encryption processing, the decryption mechanism looks substantially similar to the encryption platform. Cipher text is appropriately combined (421) with an encryption unit (423) output (422) to yield recovered plain text. The encryption unit (423) processes an input (424) provided by the encryption synchronization information and/or the output (422) (again presuming output feedback mode) as a function of an appropriate encryption algorithm and key to provide an output (422). The latter are provided to the encryption unit (423) from a memory (208) that, like the transmitter, stores various encryption algorithms (425) and keys (426). The appropriate algorithm and key are selected as a function of the key ID, the latter serving to identify an appropriate logical ID (427) which then serves to identify the appropriate algorithm and key.

The algorithms and keys stored at the receiver need not be, in their entirety, identical to those stored in the transmitter. It is important, however, that those algorithms and keys which the transmitter and receiver share in common be identified by a common logical ID.

Pursuant to the above platform, a radio can have available to it a plurality of encryption algorithms and/or encryption keys, thereby providing a greater breadth of encryption security. Because of the signalling methodology set forth above, this increase in flexibility and security has been attained without a diminution of robustness in a two-way radio environment. Instead, the multi-algorithm, multi-key receiver can quickly recover from a temporary loss of signal that quite typically occurs in a land mobile operating environment.

Referring now to FIG. 5, an alternative encryption platform will be briefly noted.

This encryption and decryption approach includes many of the same elements as the DES platform described above with reference to FIG. 4. Therefore, common elements serving common functions will not be redescribed for the sake of brevity. This embodiment, however, does not function in an output feedback mode. Instead, the input (405 in the transmitter and 424 in the receiver) provides its information to a linear feedback shift register (in this embodiment, a 64 bit register having six feedback taps), the above being understood in the art. The linear feedback shift register generates a long pseudorandom sequence. Portions of the pseudorandom sequence are conveyed to the receiver as synchronization and are utilized in the transmitter as was previously the output (403). The encryption function (404 in the transmitter and 423 in the receiver) operates on the pseudorandom sequence to create output values (403 and 422, respectively), and these values are again combined with the plain text to encrypt it or to recover plain text. Again, notwithstanding the different approach to encryption, different algorithms and keys can be held available in both the transmitter and receiver, and a particular selection of algorithm and key repetitively imparted to the receiver through frequent transmissions of the key ID information.

Pursuant to the above configurations, a number of significant benefits are obtained. Of primary importance, highly flexible encryption platforms can reliably function in a land mobile radio environment that is typically subject to communication path disturbances. Although such disturbances can and will impede reception for brief periods of time, a receiver can typically quickly recover encryption synchronization and algorithm/key information through reliance upon the methodology disclosed herein.

What is claimed is:

1. A method of transmitting system encryption information in conjunction with message information, comprising the steps of:
   A) selecting at least an encryption key and an encryption algorithm;
   B) encrypting at least a part of the message information using the encryption key and the encryption algorithm;
   C) automatically transmitting repetitively, interleaved with the message information, identifying information for the encryption key.

2. The method of claim 1, wherein the step of transmitting further includes the step of also automatically repetitively transmitting identifying information for the encryption algorithm.

3. The method of claim 2, wherein the step of transmitting further includes the step of also automatically transmitting encryption synchronization information.

4. The method of claim 1, wherein the message information comprises a series of bits.

5. The method of claim 4, wherein the series of bits are encrypted as a function of the encryption key and the encryption algorithm.

6. The method of claim 1, wherein the step of transmitting further includes the step of also automatically transmitting encryption synchronization information.

7. The method of claim 1, wherein the step of selecting further includes the step of automatically selecting an encryption key from amongst a plurality of encryption keys.

8. A method of transmitting system encryption information in conjunction with message information, comprising the steps of:
   A) selecting at least an encryption key and an encryption algorithm;
   B) forming a packet comprised of encryption synchronizing information and information identifying:
      i) the encryption key; and
      ii) the encryption algorithm;
   C) encrypting at least a part of the message information using the encryption key and the encryption algorithm;
   D) automatically repetitively transmitting the packet in an information field that is interleaved with the message information.

9. The method of claim 8, wherein the message information comprises a series of bits.

10. The method of claim 9, wherein the series of bits are encrypted as a function of the encryption key and the encryption algorithm.

11. A method of transmitting system encryption information in conjunction with message information, comprising the steps of:
    A) selecting at least an encryption key and an encryption algorithm;

B) forming an encryption information packet comprised of key ID information and encryption synchronizing information, wherein the key ID information identifies both the encryption key and the encryption algorithm;

C) encrypting at least a part of the message information using the encryption key and the encryption algorithm;

D) automatically repetitively transmitting the encryption information packet in an information field that is interleaved with the message information.

12. The method of claim 11, wherein the step of repetitively transmitting further includes the step of automatically transmitting a plurality of session data units, wherein each of the session data units includes at least one of the encryption information packets.

13. The method of claim 12, wherein each of the session data units is comprised of two data frames.

14. The method of claim 13, wherein the data frames are each comprised of a plurality of data packets, and wherein at least one of the data packets comprises an encryption information packet.

15. A radio, comprising:
A) message processing means for providing a digitized message to be transmitted;
B) first memory means for storing a plurality of encryption keys;
C) second memory means for storing a plurality of key IDs, wherein each one of the key IDs corresponds to a particular one of the plurality of encryption keys;
D) selection means for selecting a particular one of the encryption keys;
E) encryption means operably coupled to the message processing means, the first memory means, and the selection means, for processing the digitized message to be transmitted as a function of the particular encryption key and providing an encrypted message;
F) transmitter means operably coupled to the second memory means and the encryption means for transmitting:
  i) the encrypted message; and
  ii) the key ID that corresponds to the encryption key then in use;
such that the key ID is repetitively transmitted while interleaved with the encrypted message.

16. The radio of claim 15, and further comprising:
G) encryption synchronization means for providing an encryption sync signal to the transmitter means, such that the transmitter means further transmits the encryption sync signal in conjunction with transmission of the key ID.

17. The radio of claim 16, and further comprising:
H) third memory means operably coupled to the encryption means for storing a plurality of encryption algorithms and for providing such encryption algorithms to the encryption means for use thereby.

18. The radio of claim 17, wherein the key ID represents both the encryption key then in use and the encryption algorithm then in use.

* * * * *